United States Patent [19]

Donnard

[11] Patent Number: 4,886,694
[45] Date of Patent: Dec. 12, 1989

[54] EDGE CONTOUR FOR LOAD-CARRYING DECK

[75] Inventor: Rene Donnard, Geispolsheim, France

[73] Assignee: Lohr Industrie, S.A., Hangenbieten, France

[21] Appl. No.: 201,792

[22] Filed: Jun. 3, 1988

[30] Foreign Application Priority Data

Jun. 3, 1987 [FR] France ................. 87 07857

[51] Int. Cl.[4] ................................................. B32B 3/10
[52] U.S. Cl. ..................................... 428/137; 428/138;
428/192; 428/544; 52/127.8; 248/500; 248/506;
108/55.3; 108/55.5
[58] Field of Search ........................... 108/55.3, 55.5;
248/500, 506; 428/137, 138, 192, 544; 52/127.8

[56] References Cited

U.S. PATENT DOCUMENTS

| | | | |
|---|---|---|---|
| 3,472,363 | 10/1969 | Rustin, Jr. et al. .................. | 108/55.3 |
| 3,478,995 | 11/1969 | Lautzenhiser et al. ............. | 108/55.5 |
| 3,916,803 | 11/1975 | Garcia ................................. | 108/55.3 |
| 4,501,402 | 2/1985 | Saito et al. ......................... | 108/55.3 |

FOREIGN PATENT DOCUMENTS 2583807 12/1986 France ................. 428/192

Primary Examiner—Ellis P. Robinson
Assistant Examiner—P. J. Ryan

Attorney, Agent, or Firm—Schwartz & Weinrieb

[57] ABSTRACT

An edge contour for a load-carrying deck includes a substantially vertically disposed side face and a substantially horizontally disposed undersurface, and a substantially inclined support surface interconnecting the side vertical side face and the horizontal undersurface. A serial array of holes or apertures (3) are disposed in a row along the inclined support surface for accommodating hook members (17,18) of cargo lashing straps (16). By providing the inclined support surface, and the apertures or holes (3) within such surface, the inclined support surface and the apertures or holes (3) thereof are, in effect, disposed at a recessed position with respect to the vertical side surface of the load-carrying deck which defines the lateral width or extent of the load-carrying deck. Consequently, the cargo hook members (17,18), which may be quite large and bulky, do not require accommodating space which would ordinarily only be provided or required in the lateral width direction of the deck and externally of the vertical side surfaces thereof. Therefore, as a result of the present invention, the lateral width or extent of the load-carrying deck may achieve a maximum service or support function without requiring provision, in the lateral or width direction, for accommodating the cargo strap hook members (17,18).

10 Claims, 2 Drawing Sheets

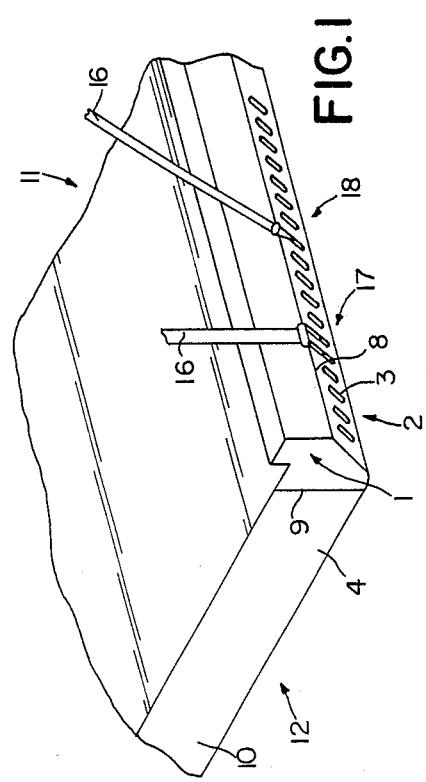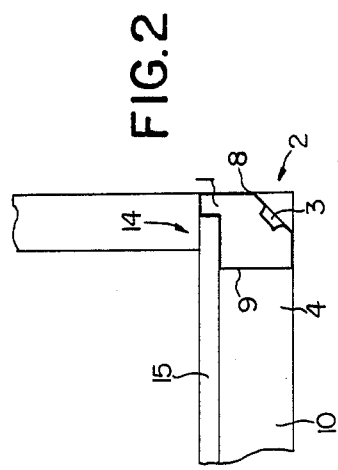

EDGE CONTOUR FOR LOAD-CARRYING DECK

The present invention relates to an edge contour for load-carrying decks.

Various linear structures on edges of decks for supporting loads exist for engaging lashing straps for loads on transport vehicles.

One example is U-shaped sections whose lower legs receive the hooks that terminate the lashing straps.

This technical form of hooking support is not very practical because of the possible shifting caused by the continuous flexible structure but especially because of the significant difficulty of unhooking when the load support is on the ground. The space between the holding leg and the ground is too small to pull out the lashing strap hooks easily and without damage.

The ground position very often corresponds to the unloading configuration.

Another linear hooking structure takes the form of a U-shaped section on its side, and opens toward the exterior of the load, along whose length there is held in a median position by appropriate braces, a support rod which the hooks at the ends of the straps engage.

While this solution has proven satisfactory for straps that encircle the load transversely, keeping the hooks in place is less reliable in the case of straps with an oblique circumscribed perimeter because of the significant risk of shifting.

The goal of the present invention is to overcome these various disadvantages by proposing an edge profile for load-carrying decks which offers good holding security as well as significant practicality.

To this end the present invention relates to an edge profile for load-carrying decks characterized by consisting of a continuous profile on each edge, comprising an oblique hooking face provided with a lateral row of holes, said hooking face being extended upward by a longitudinal contact face along the edge of the edge.

Several important advantages result from the linear hooking structure of the invention:
ease of manufacture by simple stamping sheet metal;
increased mechanical strength thanks to the reinforcing ribs in the stamped sheet metal;
the load-carrying device can be strapped while on the ground;
the oblong shape of the sheet metal permits installation and adaptation of various removable accessories and equipment at any point, especially side panels, using any locking system of the type that uses quarter-turn locking;
the accessory or device that has been installed can easily be removed, leaving the edge perfectly smooth;
the hook is fitted into a recess, in other words outside the dimensions of the truck;
the roundness of the section determines the general direction of the belt when installed and cannot damage it;
retention of the oblique strap is guaranteed in the same way as that of a straight strap.

The technical characteristics and other advantages are set forth in the description which follows, intended as a nonlimitative example of one embodiment with reference to the drawings:

FIG. 1 is a perspective view of an edge according to the invention;

FIG. 2 is a partly cut-away cross section of a load-carrying structure whose edge is fitted with an edge section;

Figure 3:
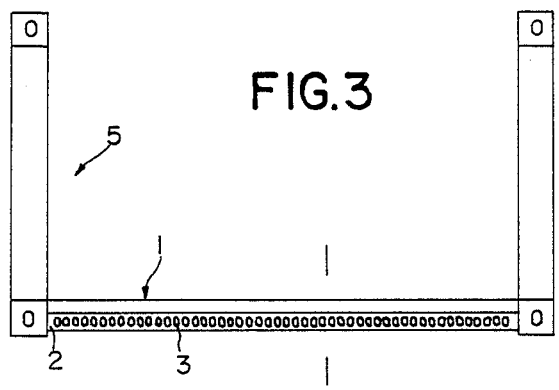
FIG. 3 is a cross section through a load-carrying structure of the pallet container type fitted with an edge section according to the invention.
Figure 4:
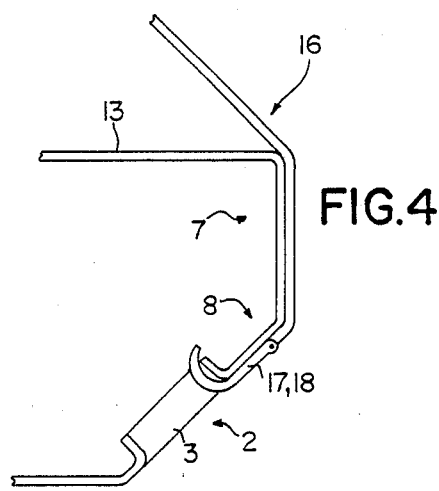
FIG. 4 is a cross section through the detail of the hooking structure with the hook of a lashing strap engaged.

The edge section according to the invention is in the form of a continuous section 1 comprising a longitudinal hooking face 2 provided with a plurality of holes such as 3, oblong for example, arranged in lateral succession to form a row. These holes are preferably made by stamping out the sheet metal of the section to form holes centered on the front of hooking face 2. This face is made slightly inclined when section 1 is in place, in other words when it is installed on edges such as 4 of a load-carrying structure 5.

Hooking face 2 is extended downward by a horizontal return 6 and upward by a lateral support face 7 whose edge is connected to hooking face 2 by a rounded surface or an angle B.

The body of section 1 can be open or entirely closed at the back by rear face 9 which abuts elements 10 of frame 11 of supporting plane 12 of load carrier 5 of the platform or pallet container type.

Section 1 preferably comprises an entirely closed section of which the upper part is a smooth face 13 or has a shoulder 14 which abuts the longitudinal edge of panel 15 of the deck.

Openings 3 allow attachment of the hooks provided at the ends of lashing straps 16 in order to hold the cargo in place.

Openings 3 also permit attachment of straps either at right angles by means of a double hook 17 which engages two holes side by side or in an oblique position using a single hook 18 like that shown in FIG. 1.

Of course the application of an edge section for a load-carrying plate according to the invention is not confined to the engagement of the hooks of a lashing strap but on the contrary extends to hooking any pieces of equipment or accessories with which load-carrying plates may be equipped.

Figure 5:
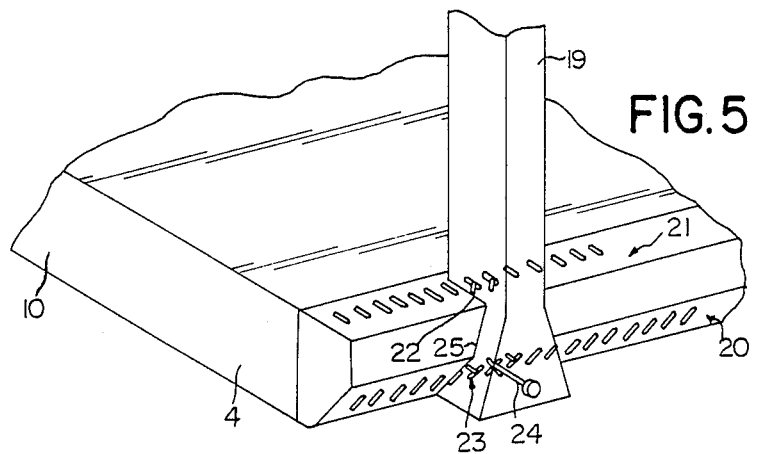
FIG. 5 is a perspective view of an edge with two rows of holes serving to anchor it to a post.

In FIG. 5, in order to illustrate this variety of applications, we have shown the hooking and immobilization of a post 19 to a section with two rows of holes 3: 21 and 21. Post 19 is mounted and held in place by means of pins or fingers such as 22 which enter holes 3 and are locked to the section by means of a locking device 23 of the type that locks after rotating a quarter of a turn, activated by an operating element 24.

Perfect locking is provided by locking device 23 and the supporting interface 25 of the post or more generally the complementary part which is shaped to match the section and by centering planes.

In addition, the invention has been described with reference to a specific embodiment. It is understood that it is not limited solely to the means described but on the contrary extends to all modifications without inventive effort which fit smoothly into its scope.

I claim:

1. An edge section for a load-carrying plate for hooking the ends of lashing straps, comprising:
a continuous section (1) mounted upon each side of said load-carrying plate, said section having an oblique hooking face (2) provided with a lateral row of holes (3),
said hooking face (2) being extended upwardly by a longitudinal supporting face extending along the side of the edge section; and
said oblique hooking face being recessed relative to said supporting face.

2. An edge section according to claim 1 characterized by holes (3) having an oblong shape.

3. An edge section according to claim 2 characterized by the oblong shapes being transversely.

4. An edge section according to claim 1 characterized by holes (3) being stamped out of sheet metal.

5. An edge section according to claim 1 characterized by section (1) having a closed segment.

6. An edge section according to claim 1 characterized by the upper face of section (1) being planar.

7. An edge section according to claim 1 characterized by the top face of section (1) having a shoulder (14).

8. An edge section as set forth in claim 1, wherein:
said hooking face is disposed beneath said supporting face so as to be recessed below said supporting face.

9. An edge section as set forth in claim 1, wherein said continuous section further comprises:
a horizontally extending lower wall; and
said oblique hooking face is interposed between said horizontally extending lower wall and said upwardly extending supporting face so as to interconnect said lower wall and said supporting face.

10. An edge section as set forth in claim 5, wherein:
said closed segment has at least five surfaces including said oblique hooking face.

* * * * *